(12) United States Patent
Berg

(10) Patent No.: US 9,747,091 B1
(45) Date of Patent: Aug. 29, 2017

(54) ISOLATED SOFTWARE INSTALLATION

(71) Applicant: Amazon Technologies, Inc., Reno, NV (US)

(72) Inventor: Paul William Berg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 14/230,920

(22) Filed: Mar. 31, 2014

(51) Int. Cl.
 *G06F 9/445* (2006.01)
(52) U.S. Cl.
 CPC ...................... *G06F 8/61* (2013.01)
(58) Field of Classification Search
 None
 See application file for complete search history.

(56) References Cited

U.S. PATENT DOCUMENTS

| 7,231,410 B1* | 6/2007 | Walsh ................. G06F 8/71 707/999.2 |
| 2015/0227355 A1* | 8/2015 | Tripoli ................. G06F 8/63 717/175 |

\* cited by examiner

*Primary Examiner* — Qamrun Nahar
(74) *Attorney, Agent, or Firm* — Thorpe North & Western, LLP.

(57) ABSTRACT

A technology to isolate user software installations is described. A package database of software packages is maintained. A file system for a user account is isolated by setting a root directory of a file system hierarchy in the file system to be a user directory structure for the user account. A software package is installed from the package database into the user directory structure by linking files from the package database into the user directory structure.

20 Claims, 8 Drawing Sheets

ISOLATED SOFTWARE INSTALLATION

BACKGROUND

A root directory is the top-most directory in a computer file system hierarchy. In some computer systems, the root directory contains specific subdirectories for applications, libraries and configuration data. For example, in Unix-like operating systems the root directory is usually denoted with a single '/'. Some examples of specific subdirectories in Unix-like operating systems include '/bin', '/etc' and '/lib'. In the Windows® operating system, each drive is represented by a letter and a root directory for the drive (e.g. 'C:\'). The root directory on the Windows® system drive usually includes specific subdirectories such as 'C:\Program Files' and 'C:\Windows'.

Sometimes users of a computer system can access the root directory. Many operating systems, however, may limit users' ability to make changes to the root directory and important subdirectories. For example, a non-administrative user may not be able to delete files or subdirectories in the root directory, since doing so may destabilize the computer system or make the computer system insecure.

DETAILED DESCRIPTION

Figure 1:
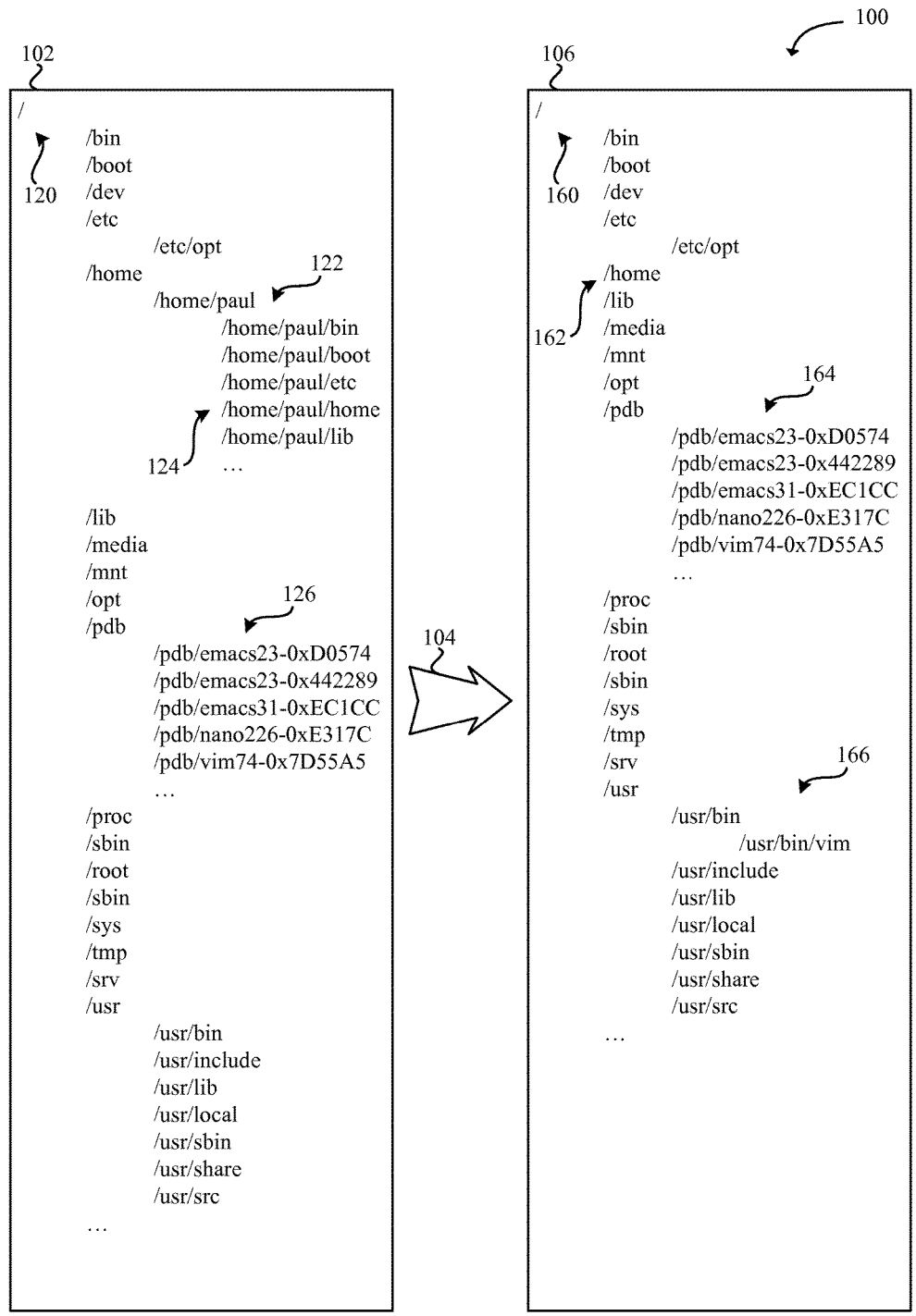
FIG. 1 illustrates an example of changing a root directory of a file system hierarchy in a file system.

A software installation technology is described that may effectively isolate user software installations. A user may not need administrative credentials to install software onto the user directory structure of the computer system.

The technology provides a package database for software installations. The package database may take the form of a set of directories, in one example. A directory for a software package may be labeled using the software package name and the software package version, for instance. Additionally, the directory for the software package may include a hash value that is based at least in part on the software package, the software package dependencies and the tool chain used to build the software package. A tool chain may be the set of install tools that are used to create the software package.

Thus, multiple versions of a software package may be maintained in the package database. In particular, even slight differences in various versions of the same software package (e.g. software packages compiled with different compiler versions) may coexist within the package database.

The technology may include linking files from the package database into specific areas of the root directory structure. In this way, a coherent view of the file system may be maintained in the root directory structure regardless of what individual users may install into the package database. The technology further includes user directory structures to isolate portions of the file system for user accounts. A user directory structure may be associated with a user account, and a root directory of a file system hierarchy in the file system may be changed to be the user directory structure for the user account. The user directory may, therefore, appear to be the root directory of the file system for the user account and thereby isolate the file system for the user and provide the ability for localized software installations using localized software installations.

Through file links into the package database, users may have a similar set of files in their user directory structure as the computer system's root directory. Since the user's view of the root directory of the file system hierarchy in the file system may be changed to the user directory for the user account, users may install software packages into their user directory (e.g. their root directory) without necessarily affecting the computer system's root directory or other users' view of the file system.

In one example, a package management account on the computer system may have ownership permissions to the package database. In this way, the package management account may help to ensure the integrity of the package database. Thus, users may be limited from modifying or deleting files within the package database. In some configurations, users may be limited to installing software packages from the package database, thereby limiting what a malicious user may be able to install on the computer system.

Moreover, without necessarily having administrative credentials, users may be able to install packages into their user directory structure by linking files from the package database into their user directory structure. Symbolic links may be made to cause various files in a user directory to point to specific files located within the package database directory. Since installation is performed through links pointing to the package database, multiple users may use the same software without having multiple copies located throughout the file system. Thus, the technology may save on storage space and operating memory usage. Additionally, the technology may allow a single user to have multiple user directory structures with different software configurations and may allow the user to switch between the multiple user directory structures as desired. Further, a package manager associated with the localized and isolated package database may enable easy management of dependency trees for software packages and provide a central updating repository for software packages on the computer system. For instance, two users may want to install different versions of the same software package. Since the two versions of the software package may contain files with the same name and location in the file system, installation of the two different versions may cause problems on some computer systems. As an example, the first version of the software package may install a first version of a library in a particular directory and the second version of the software package may overwrite the first version of the library in the particular directory with a second version of the library. Generally a computer system may become unstable through installation of the two different versions of the same software package. The technology, however, may alleviate such an issue.

In a further example, a virtualized computing instance may be initiated (e.g., on a hypervisor or virtual machine manager (VMM)) with an operating system kernel and skeleton root directory structure. The operating system kernel may then mount the package database and customize the virtualized computing instance using links from the package database. In this way, a centralized package database may be used in a virtual computing environment to reduce storage costs and allow more centralized management. For instance, various distributions of Linux may be configured with the same basic Linux kernel and skeleton root directory structure without any installed packages. During initialization, the Linux kernel may mount the package database and symbolically link packages that comprise a base system for a particular Linux distribution.

To more clearly describe the technology, examples are now provided with reference to the figures. Accordingly, FIG. 1 illustrates an example use of changing a root directory of a file system hierarchy in a file system 100. The file system 100 may have a root view 102 and a user view 106 for a specific user account. The root view 102 may be the full view of the file system 100. The root view 102 may include a root directory 120. All of the files and sub-directories within the file system 100 may be accessed with reference to the root directory 120. In a Unix style example, the root directory 120 may have various subdirectories common to many Unix-like file systems such as '/bin', '/boot', '/dev', '/etc' and '/lib'. The root directory may also include a package database directory 126. In addition, a '/home' subdirectory of the root directory 120 may include a user directory structure 122 for the user account named 'paul'. In this way, the user directory structure 122 may be associated with a user account. Further, a home directory 124 may be included within the user directory structure 122.

The user view 106 may be the view of the file system 100 for the user account. For instance, a root directory 160 of the file system 100 may be changed to be the user directory structure 122 for the user account, as indicated by the arrow 104. In Unix-like operating systems, this may be accomplished through executing a 'chroot' command. The 'chroot' command may change the apparent root directory for the process invoking the chroot command and children processes of the process invoking the 'chroot' command. In this case, the apparent root directory is changed for the user and specific user account. Thus, files and subdirectories within the user directory structure 122 may be included in the user view 106 directly under the root directory 160 of the user view 106. For example, the user view 106 may include a home directory 162 within the root directory 160 which corresponds to the home directory 124 in the user directory structure 122 as shown in the root view 102.

Typically, a program that is executed within a chroot-modified environment cannot reference files outside the specified root directory tree. As an example, since the package database directory 126 may be located outside the user directory structure 122, the package database directory 126, without further intervention, may not normally be accessible from the root directory 160 in the user view 106. Therefore, in order to provide the user account access to the package database, the package database directory 126 may be mounted into the package database directory 164 within the root directory 160 in the user view 106, as also indicated by the arrow 104. In Unix-like operating systems, the 'mount' command may be executed to perform this function (e.g. "mount—bind/pdb/home/paul/pdb"). In this way the package database directory may be mounted into a subdirectory of the user directory structure 122 (also known as the root directory 160). Before a user can access a file on a Unix-like operating system, the file system that contains the file may generally need to be mounted with the 'mount' command. The 'mount' command may instruct the operating system that a file system is ready to use, and may associate the file system with a particular point in the overall file system hierarchy.

Once the package database directory 164 is capable of being be referenced from the root directory 160 within the user view 106, symbolic links can be made to link files from the package database directory 164 into the user directory structure to install a software package for the user account. For example, a file may be linked (e.g., using symbolic links) into a specific location 166 within the file system 100 in order for the software package to be correctly installed. In Unix-like operating systems, this may be effectuated through a symbolic link (e.g. "ln-s/pdb/vim74-0x7D55A5/ usr/bin/vim/usr/bin/vim"). This symbolic linking may be repeated for all the files within a software package and dependencies of the software package.

The package database directory may also have software packages directly installed therein. For example, a software repository external to the file system 100 may be in communication with the package database directory in order to download a new software package into the package database directory. In installing the software package into the package database directory, a package manager may include a unique identifier for the software package. In one example, a subdirectory within the package database directory may have a name that includes the unique identifier. In another example, the unique identifier may be stored in a meta-information file.

The file system 100 may also include access control permissions. Some file systems, for example, have methods of assigning permissions or access rights to specific users and groups of users. For instance, a computer file system may allow or restrict certain users from making changes to file system objects within the file system. In a Unix-like system, a user account may be given ownership permissions of particular file system objects (e.g. files and directories) in the file system. Having the ownership permissions of a file system object may allow a user account to have full control of the file system object.

This technology may utilize access control permissions to more fully secure the file system. For example, a user account may have ownership permissions to the user directory structure and may be able to symbolically link files from the package database directory into the user directory structure without ownership permissions for the root directory structure (e.g., the user may have read only privileges in the root structure). In this way, the user account may be able to install software packages without having to obtain additional access control permissions.

In some package management systems, a non-administrative user may need administrative credentials in order to install software packages. In contrast, this technology advantageously allows a user to perform isolated user software installations without administrative credentials and/or additional access control permissions.

Likewise, a package management account may be provided that has ownership permissions to the package database directory. The package management account may be able to install software packages into the package database directory. In this way, package management may be decoupled from the root administrative privileges in some file systems, for example.

In addition to a package database directory, a package database may be provided through directory-less means. For example, the package database may be located in a relational database, object oriented database, single directory or a key-value store. Thus, in a more general sense, a package database of software packages may be maintained for installations of software packages. A package manager may be software configured to provide functionality to add, delete and update software packages in the package database, for instance. In this way, creating and maintaining a package database directory for the package database may be specific way of maintaining the package database. One way of maintaining a package database may include generating a set of directories in the package database directory with a unique identifier for each software package in the package database. The unique identifier for each software package in the package database may be based in part on attributes such as the software package name, the set of package dependencies, the source software package hash value, the software development tool chain used to build the software package, a set of compilation configuration values, the built software package hash value, an instruction set architecture (ISA) of the software package and/or other uniquely identifying values.

Figure 2:
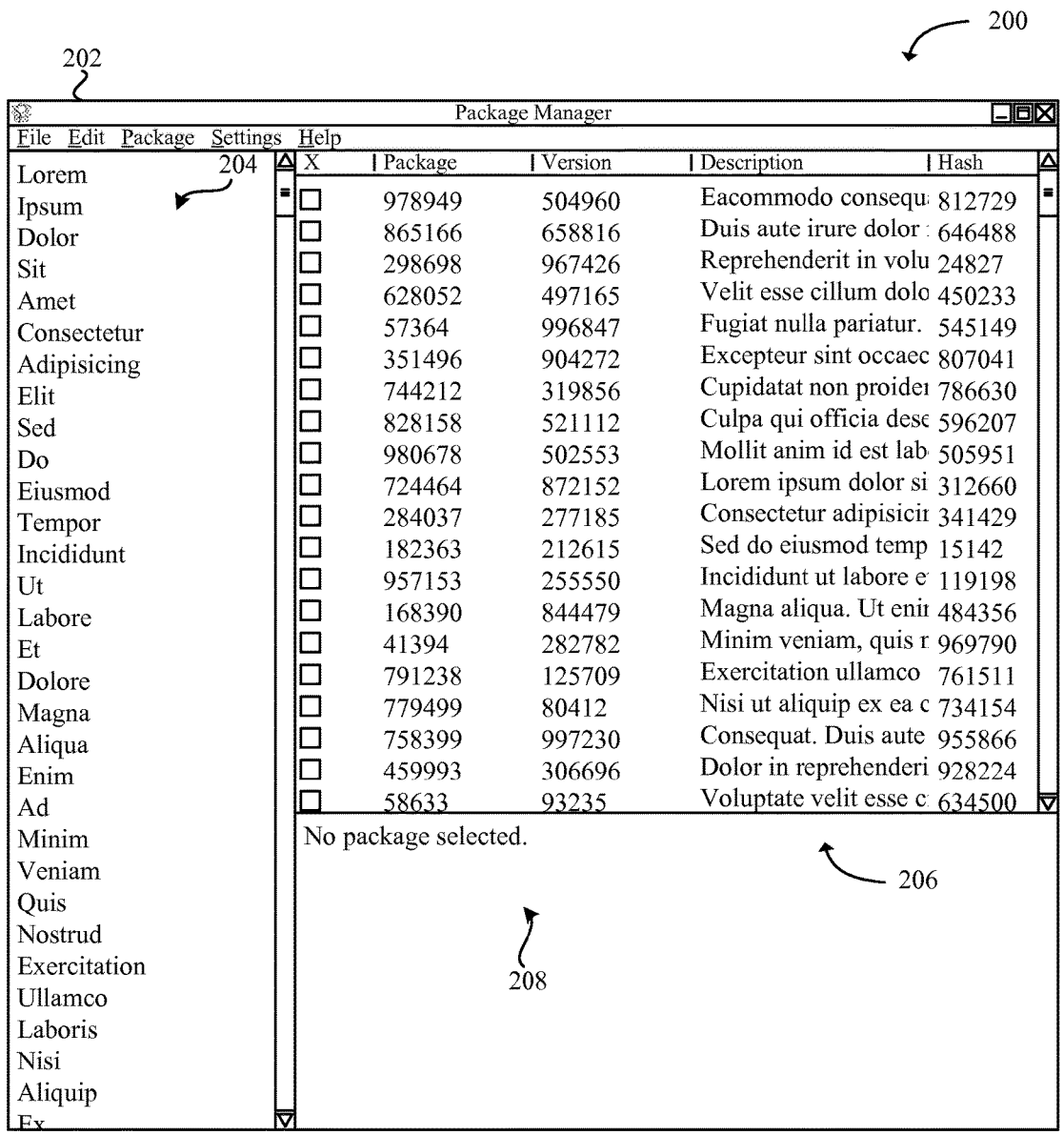
FIG. 2 illustrates an example of a graphical user interface for a package manager.

FIG. 2 illustrates an example of a graphical user interface (GUI) 202 for a package manager 200. The GUI 202 may include a list of package categories 204. Within each package category, the GUI 202 may display a set of available packages 206. When a particular software package is selected from the set of available packages 206, a package description 208 may explain the purpose and/or use of the software package selected.

The package manager 200 may also include a command line interface or other interfaces such as an application programming interface (API). Regardless of the particular interface, the package manager 200 may generally manage software packages in the package database.

The package manager 200 may also include additional functionality. For example, the package manager 200 may install software packages from the package database into a user directory structure by linking files from the package database into the user directory structure. While the package manager 200 may be configured to both manage software packages in the package database and install software packages into the user directory structure, in some examples the user account may install software packages into the user directory structure. In a further example, the package manager may be executed by either a package management account or a user account. In some instances when executed by a package management account, additional features may be available in the package manager such as the ability to install software packages into the package database.

The package manager 200 may be able to handle specific types of package formats. For example, the package manager 200 may include instructions to manage software packages from the following types of package formats: Gentoo ebuild format, Red Hat package manager (RPM) format, Debian package (DEB) format, Solaris package (PKG) format, tape archive (TAR) format, and/or GNU Gzip (GZ) format.

Aside from the package manager 200, additional software executable by a computer processor may be included. For example, specific software or other circuitry may isolate the file system for a user account by setting a root directory of a file system to be the user directory structure, in accordance with the technology.

The package manager 200 or an auxiliary piece of software may also handle generation of unique identifiers, as discussed above. In particular, the technology may include instructions to generate a unique identifier for each software package in the package database. For example, the unique identifier may be based in part on a software package name, a set of package dependencies, a source software package hash value, a software development tool chain used to build the software package, a set of compilation configuration values, a built software package hash value, and/or an instruction set architecture (ISA) of the software package.

Figure 3:
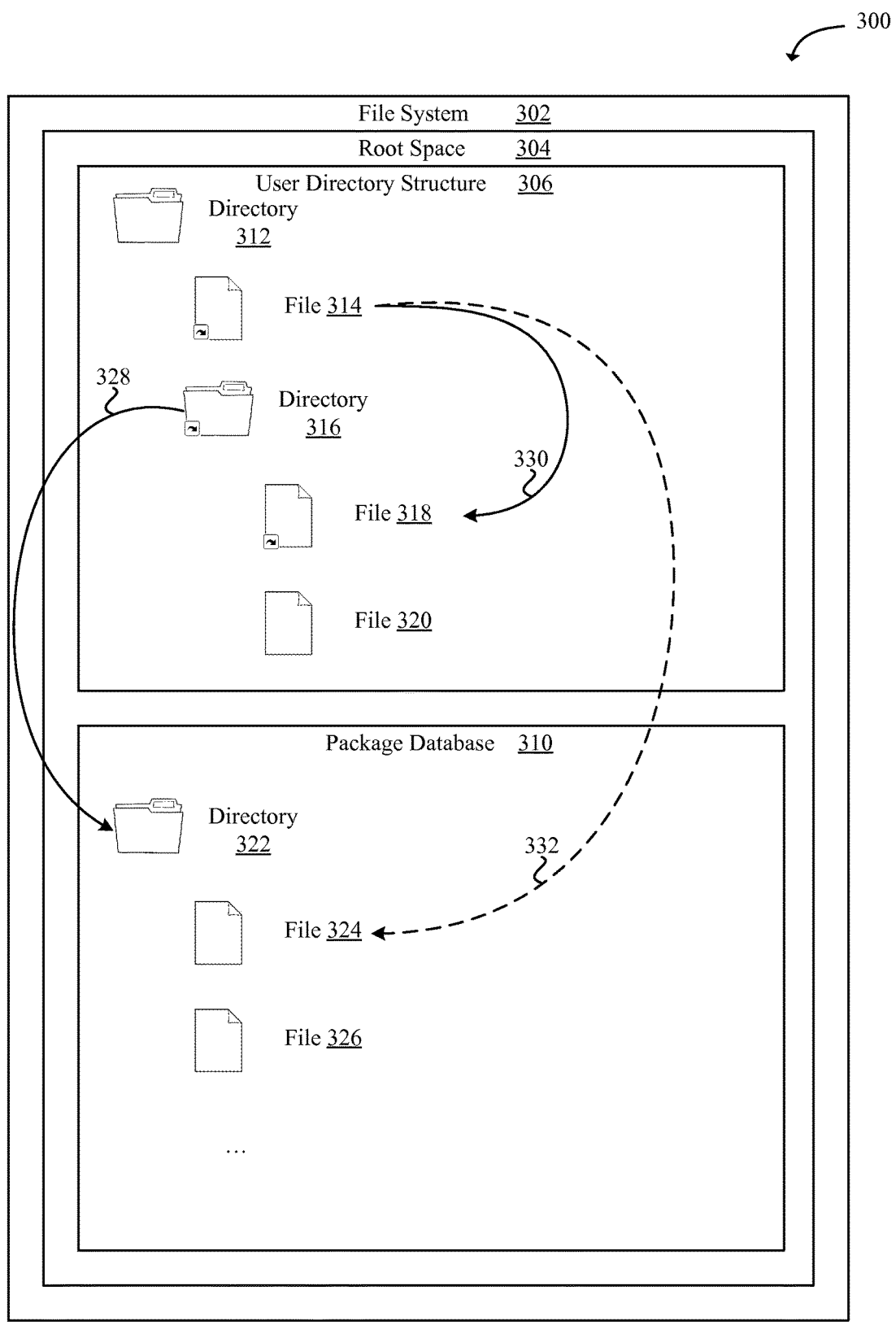
FIG. 3 illustrates an example of mounting a package database and files into a user directory structure.

FIG. 3 illustrates an example 300 of mounting a package database 310 and files therein into a user directory structure 306. The user directory structure 306 and the package database 310 may be subdirectories of a root space 304 within a file system 302, according to one example. In particular, the example 300 illustrates mounting and linking of various files and directories such that a file in the user directory structure 306 in effect points to a file in the package database 310.

The package database 310 may include a directory 322 and a first file 324 and a second file 326 within the directory 322. The user directory structure 306 may include a directory 312 with a first file 314 and a subdirectory 316 therein. The subdirectory may also include a first file 318 and a second file 320. The subdirectory 316 in the user directory structure 306 may be a directory mount of the directory 322 in the package database 310, as indicated by the arrow 328. For example, in Unix-like operating systems, the 'mount' command may be executed to perform a mount of the entire package database directory to a directory in the user directory structure 306 (e.g. "mount—bind/Package Database/Directory/User Directory Structure/Directory/Directory").

Links may also be made within the user directory structure 306. For instance, the file 314 in the directory 312 in the user directory structure 306 may be linked to the first file 318 in the subdirectory 316 in the user directory structure 306, as indicated by the arrow 330. In some file systems, a symbolic link may be created by issuing a symbolic link command (e.g. "ln-s/User Directory Structure/Directory/File/User Directory Structure/Directory/Directory/File").

With the combination of the mounting 328 and the linking 330, the file 314 in the directory 312 within the user directory structure 306 may indirectly reference the file 324 in the directory 322 in the package database 310. In this way, the technology provides a way to effectively isolate user file system use through use of a user directory structure and a package database with links and/or mounts from the package database into predefined areas of the user directory structure. Thus, the file system may be isolated for a user account by setting a root directory of a file system hierarchy in the file system to be the user directory structure for the user account. Moreover, software packages may be installed from the package database into the user directory structure by linking files from the package database into the user directory structure. Conversely, software packages installed in the package database may be uninstalled by removing by removing a directory structure associated with the software package. Additionally, a software package installed in the user directory structure may be uninstalled by unlinking files from the package database into the user directory structure. In uninstalling software packages from the package database, a garbage collection process may identify whether a software package is being used by any user accounts and recommend uninstallation of the software package from the package database. Alternatively, the garbage collection process may automatically initiate uninstallation of the unused software package.

A user account may have ownership permissions to objects in the user directory structure and may be able to symbolically link files from the package database into the user directory structure. Likewise, a package management account may be provided that has ownership permissions to the package database. The package management account may be able to install software packages into the package database. Further, the package management account may be able to symbolically link software packages from the package database into the user directory structure to install a software package into the user directory structure.

In one example, the user account may make a request to the package management account to install a software package. In particular, the user may request installation of a software package into the package database by a package management account. The software package may then be installed in to the package database by the package management account and the user account may request that the software package then be installed into the user directory structure by the package management account. However, with the present technology, full administrative access is may not be necessary in order to use the package manager.

Figure 4:
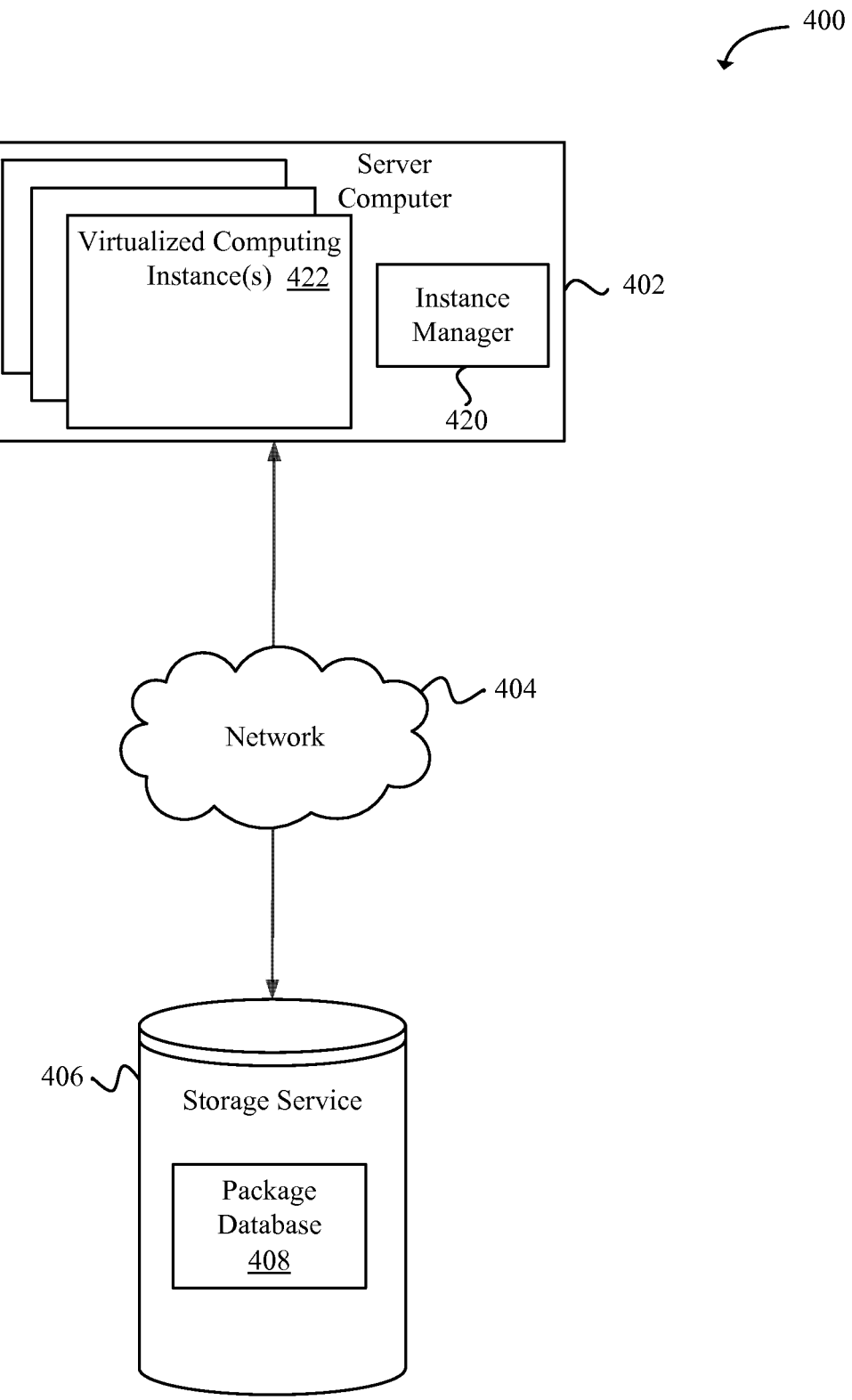
FIG. 4 illustrates an example of a package database on a storage service accessed over a network.

FIG. 4 illustrates an example 400 of a package database 408 on a storage service 406 accessed over a network 404 or an actual network. Virtualized computing is a way to reduce computing costs and/or provide a more robust computing environment. Using virtualized computing, a customer may be able to purchase computing resources for a given period of time, for example. Moreover, a virtualized computing service provider may provide a service level agreement (SLA) guaranteeing a certain level of reliability. While virtualized computing has been available for some time, virtualized computing service implementations have adjusted with changing technology. With the advent of the Internet, for instance, the access to computing resources over a network has given rise to the notion that computational power may become increasingly similar to a utility. In this way, more computationally intensive processing may take place somewhere in the network away from a client device, while the local processing on the client device may be simply rendering the results delivered over the network, for example.

In some virtualized computing environments, a virtual network is used to provide a logically isolated virtual network for a user. With virtual networking, the user can be given complete control over the virtual network, including selecting an IP address range, creation of subnets, configuration of route tables, etc. A virtual network is a virtualized computer network which is built on top of an underlying physical network (e.g., a substrate network) and physical computing resources. Nodes in the virtual network are assigned virtual IP addresses and packets sent to and from the nodes are routed through one or more physical links in the underlying network.

The technology may be particularly advantageous in a virtualized computing environment. In particular, the technology may allow a provider to offer a central package database. In this way, the package database 408 may not need to be unnecessarily duplicated and the provider may reduce storage costs across the virtualized computing environment. Other advancements in the technology may include the ability to minimize memory usage within the virtualized computing environment. For example, the server computer 402 may be a physical computer with multiple virtualized computing instances 422 executing thereon through use of an instance manager 420 (e.g. a hypervisor). A virtualized computing instance 422 may access the package database 408 on the storage service 406 through the network 404. The storage service 406 may be a block level storage service, a volume oriented service, a bucket oriented service, an archive storage service or another type of storage service. In one example, a directory may be created on the storage service 406 to contain the package database 408. Locating the package database directory on the virtualized computing instance 422 may also include mounting a network mount in the virtualized computing instance 422 pointing to the package database directory. In some examples, a user account may be logged into a virtualized computing instance 422 which may be in communication with the storage service 406 over a network in order to properly mount the package database 408. The user account on the file system of the virtualized computing instance 422 may be isolated using a login script that executes when the user account logs into the system, for instance.

The virtualized computing instances 422 may be initiated with a bare operating system. For example, the virtualized computing instances 422 may boot to a kernel of the operating system and minimal root directory structure. The operating system kernel may then mount the package database 408 located in the storage service 406. Once the package database 408 is mounted, instructions may be executed by the operating system kernel to customize the virtualized computing instances using links from the package database. For instance, various distributions of an operating system may be configured with the same basic operating system kernel and minimal root directory structure. During initialization, the operating system kernel may mount the package database and symbolically link packages that comprise a base system or a certain configuration for a particular operating system distribution. In this way, a centralized package database may be used in a virtual computing environment to reduce storage costs and allow for a more centralized management system for software installation on virtualized computing instances 422.

In an example embodiment, the service provider can expose interfaces to allow a user (e.g., a customer) to customize virtual machines. Briefly, the service provider can expose a web service application program interface that allows users to submit commands to launch virtual machines to a compute service. The compute service in turn can select a server to host a virtual machine and cause the server to launch the virtual machine.

In an example embodiment, the web service application program interface, and the compute service itself, can be extended to allow a customer to select customizations for the virtualized computing instances. For example, the schema of the application program interface can be extended to allow a user to pass a selection of packages to install in the virtual machine. For example, the application interface can be extended to allow a user to pass a tag or policy that is linked to a set of packages, a file specifying the packages, the list of packages, etc. to the compute service. The compute service front end can include a parser that can identify the selection of packages and record the selection in a database in association with the launch request. The selection of packages can be passed to the host server along with other launch information and the virtual machine can be instantiated. The operating system kernel may then mount the package database 408 located in the storage service 406. Once the package database 408 is mounted, an installer module may be executed by the operating system kernel to customize the virtualized computing instances using links from the package database.

While the term virtualized computing instance 422 (e.g., virtual machines) is used throughout this description for the purpose of illustration of particular examples, the techniques described herein are applicable in other circumstances, such as networks in which one or more or even all the network member instances are not virtualized. Further, in an example, the packets may be Internet Protocol (IP) packets. However, while IP packets are used throughout for the purpose of illustration, the techniques herein are applicable to other communication protocols which may not necessarily utilize IP or other data packets, such as the IPX/SPX protocol or the NETBEUI (NetBIOS Extended User Interface) protocol.

Figure 5:
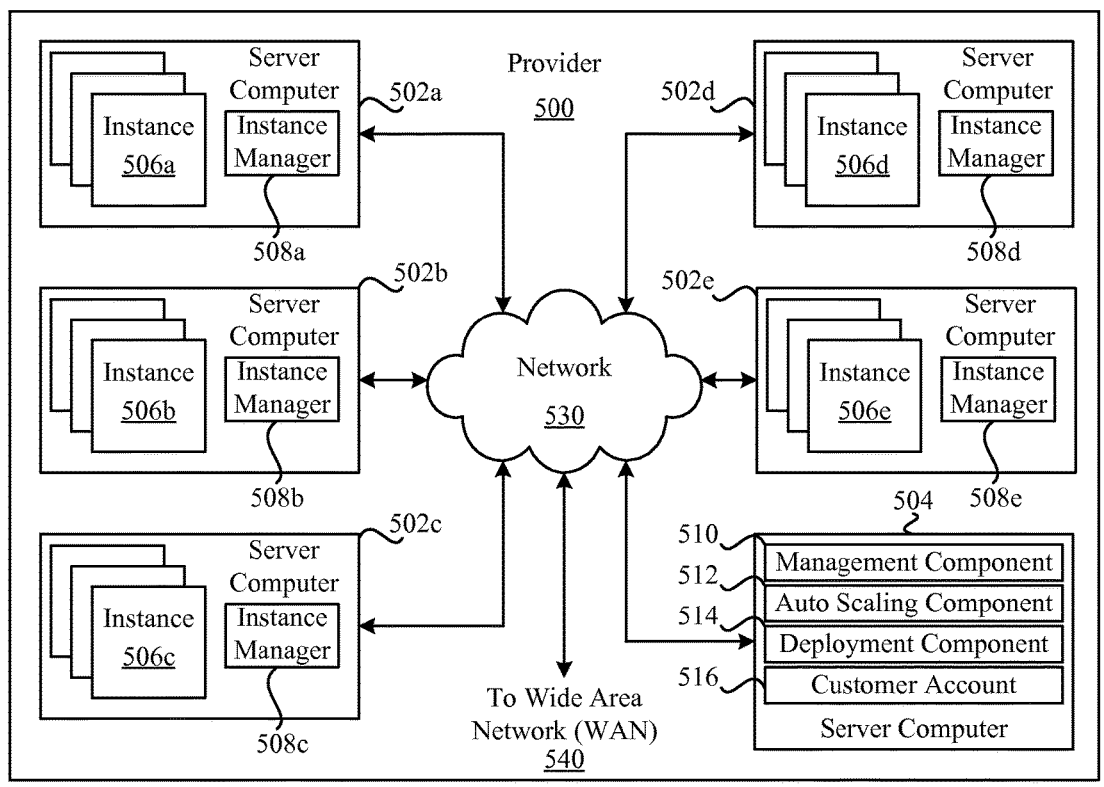
FIG. 5 illustrates an example of a provider that may be used to implement a compute service.

FIG. 5 illustrates an example of a provider that may be used to implement the computing service according to FIG. 4. In particular, a network-based provider 500 is depicted that illustrates one environment in which the technology described herein may be used. More particularly, the provider 500 may provide a network 530, a virtualized computing instance 506a-e (also known simply as "instance"), a storage service and other virtualized computing resources. Many virtualized computing resources may be provided through creating a virtualized computing instance with access to software abstracting the resource as executed on a hardware substrate. For example, a storage service may be implemented by sharing a disk drive on a virtualized computing instance.

The provider 500 (e.g., the cloud provider) is capable of delivery of computing and storage capacity as a service to a community of end recipients. In one example, the provider can be established for an organization by or on behalf of the organization. That is, the provider 500 may offer a "private cloud environment." In another example, the provider 500 supports a multi-tenant environment, wherein a plurality of customers operate independently (i.e., a public cloud environment). Generally speaking, the provider 500 can provide the following models: Infrastructure as a Service ("IaaS"), Platform as a Service ("PaaS"), and/or Software as a Service ("SaaS"). Other models can be provided. For the IaaS model, the provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the provider platform without the cost of buying and managing the underlying hardware and software. The SaaS model allows installation and operation of application software in the provider. End users may access the provider 500 using networked client devices, such as desktop computers, laptops, tablets, smartphones, etc. running web browsers or other lightweight client applications, for example. Those skilled in the art will recognize that the provider 500 can be described as a "cloud" environment.

The provider 500 includes a plurality of server computers 502a-e. While only four server computers are shown, any number can be used, and large centers can include thousands of server computers. The server computers 502a-e can provide computing resources for executing software instances 506a-e. Instances 506a-e may, for example, be virtual machines. As known in the art, a virtual machine is an instance of a software implementation of a machine (i.e. a computer) that executes applications like a physical machine. In the example of virtual machine, each of the server computers 502a-e can be configured to execute an instance manager 508a-e capable of executing the instances. The instance manager 508a-e can be a hypervisor or another type of program configured to enable the execution of multiple instances 506a-e on a single server. Additionally, each of the instances 506a-e can be configured to execute one or more applications. The instances 506a-e are examples of virtualized computing instances, and a subset of the instances 506a-e may be members of one or more network groups.

It should be appreciated that although the discussion herein is primarily in the context of virtual machines, other types of instances can be utilized with the concepts and technologies disclosed herein. For instance, the technologies disclosed herein can be utilized with storage resources, data communications resources, and with other types of computing resources. The technology might also execute all or a portion of an application directly on a computer system without utilizing virtualized computing instances.

One or more server computers 504 can be reserved for executing software components for managing the operation of the server computers 502 and the instances 506a-e. For example, a server computer 504 can execute a management component 510. A customer can access the management component 510 to configure various aspects of the operation of the instances 506a-e purchased by the customer. For example, the customer can purchase, rent or lease instances and make changes to the configuration of the instances. The customer can also specify settings regarding how the purchased instances are to be scaled in response to demand. An auto scaling component 512 can scale the instances 506a-e based upon rules defined by the customer. The auto scaling component 512 may allow a customer to specify scale-up rules for use in determining when new instances should be instantiated, and scale-down rules for use in determining when existing instances should be terminated, for example. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506a-e of computing resources. The deployment component can have access to account information associated with the instances, such as who is the owner of the account, credit card information, country of the owner, etc. The deployment component 514 can receive a configuration from a customer that includes data describing how new instances 506a-e may be configured. For example, the configuration can specify one or more applications to be installed in new instances 506a-e, provide scripts and/or other types of code to be executed for configuring new instances 506a-e, provide cache logic specifying how an application cache should be prepared, and other types of information. The deployment component 514 can utilize the customer-provided configuration and cache logic to configure, prime, and launch new instances 506a-e. The configuration, cache logic, and other information may be specified by a customer using the management component 510 or by providing this information directly to the deployment component 514.

Customer account information 516 can include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information 516 may also include security information used in encryption of asynchronous responses to API requests. By "asynchronous"

it is meant that the API response can be made at any time after the initial request and with a different network connection.

A network 530 can be utilized to interconnect the server computers 502*a*-*e* and the server computer 504. The network 530 can be a local area network (LAN) and can be connected to a Wide Area Network (WAN) 540 so that end users can access the provider 500. It should be appreciated that the network topology illustrated in FIG. 5 has been simplified and that many more networks and networking devices can be utilized to interconnect the various computing systems disclosed herein. More particularly, the network 530 may implement a physical network on which a virtual network may be based. The technology may be useful in such a computing service environment offered by a virtual computing service and network provider. The computing service environment may be configured to offer a central package database. In this way, the package database may not need to be unnecessarily duplicated and the computing service provider may reduce storage costs across the computing service environment.

Figure 6:
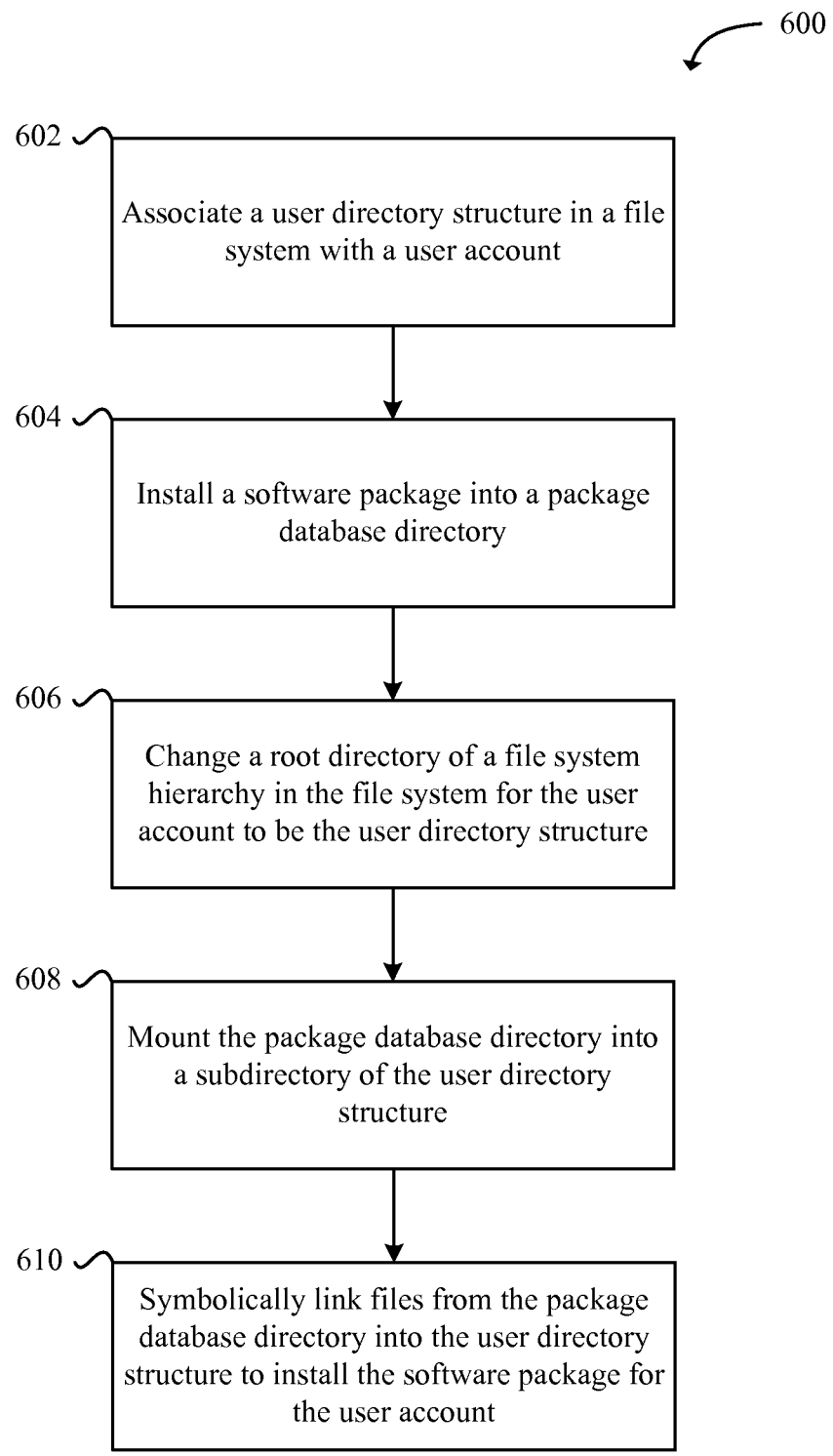
FIGS. 6-7 are flowcharts illustrating example methods to isolate user software installations.

FIG. 6 is a flowchart illustrating an example method to isolate user software installations. The method 600 may include associating a user directory structure in a file system with a user account, as shown in method element 602, and installing a software package into a package database directory, as shown in method element 604. Similarly, software packages installed in the package database may be uninstalled by removing a directory structure associated with the software package. The method may include changing a root directory of a file system hierarchy in the file system for the user account to be the user directory structure, as shown in method element 606. In this way, the user directory may appear to be the root directory of the file system for the user account.

The method may also include mounting the package database directory into a subdirectory of the user directory structure, as shown in method element 608, and symbolically linking files from the package database directory into the user directory structure to install the software package for the user account, as shown in method element 610. This mounting and linking may be performed while operating in user execution space. The term user execution space means the execution space outside kernel space in Unix-like operating system. In Unix-like operating systems, the 'mount' command may be executed to perform this mounting function. In this way, the package database directory may be mounted into a subdirectory of the user directory structure. Symbolic links may also be made to link specific files located within the package database directory to a user directory or user directory structure. Since a software package installation in the user directory structure is performed through links pointing to the package database, multiple users may use the same software package without having multiple copies located throughout the file system. The technology, therefore, may save on storage space and operating memory usage and also allow a single user to have multiple user directory structures with different software configurations and may allow the user to switch between the multiple user directory structures as desired. Moreover, a package manager associated with the localized and isolated package database may allow for easy management of dependency trees for software packages and provide a central updating means for software packages on the computer system.

Figure 7:
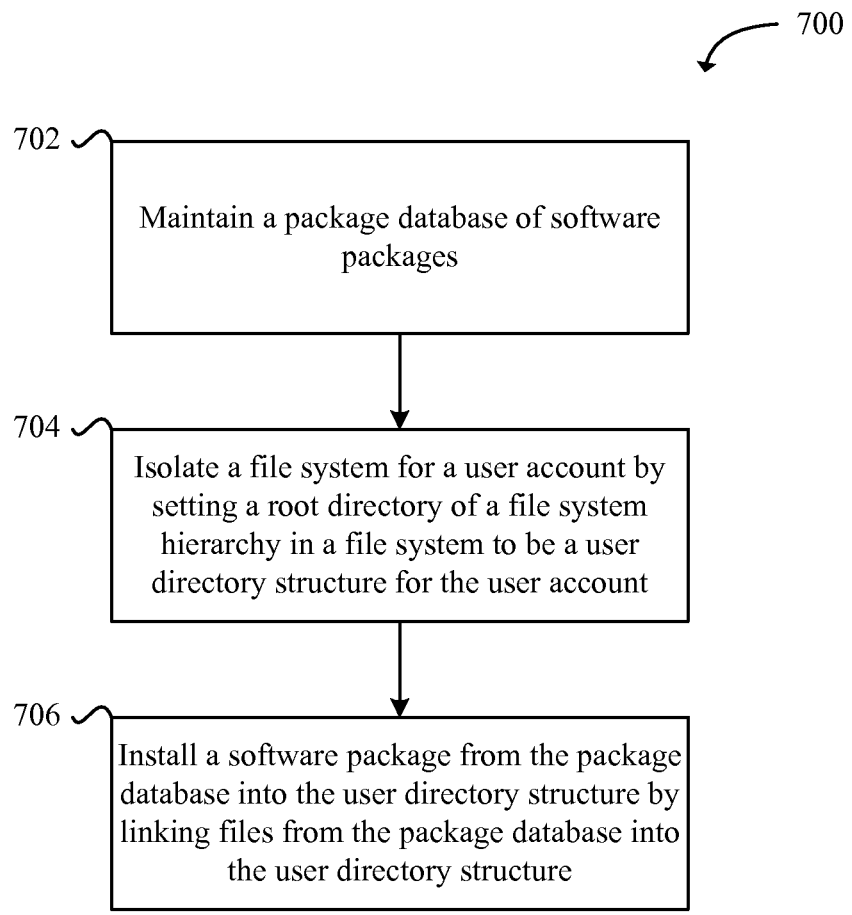

FIG. 7 is a flowchart illustrating an example method to isolate user software installations. The method 700 may include maintaining a package database of software packages, as shown in method element 702, and isolating a file system for a user account by setting a root directory of a file system hierarchy in the file system to be a user directory structure for the user account, as shown in method element 704. Thus, a user view of the file system may be created and maintained for the user account. In this way, a coherent view of the file system may be maintained in the root directory structure, regardless of what individual users may install into the package database. The method may include installing a software package from the package database into the user directory structure by linking files from the package database into the user directory structure, as shown in method element 706. As an example, a user directory structure may be associated with a user account, and a root directory of the file system may be changed to be the user directory structure for the user account.

Figure 8:
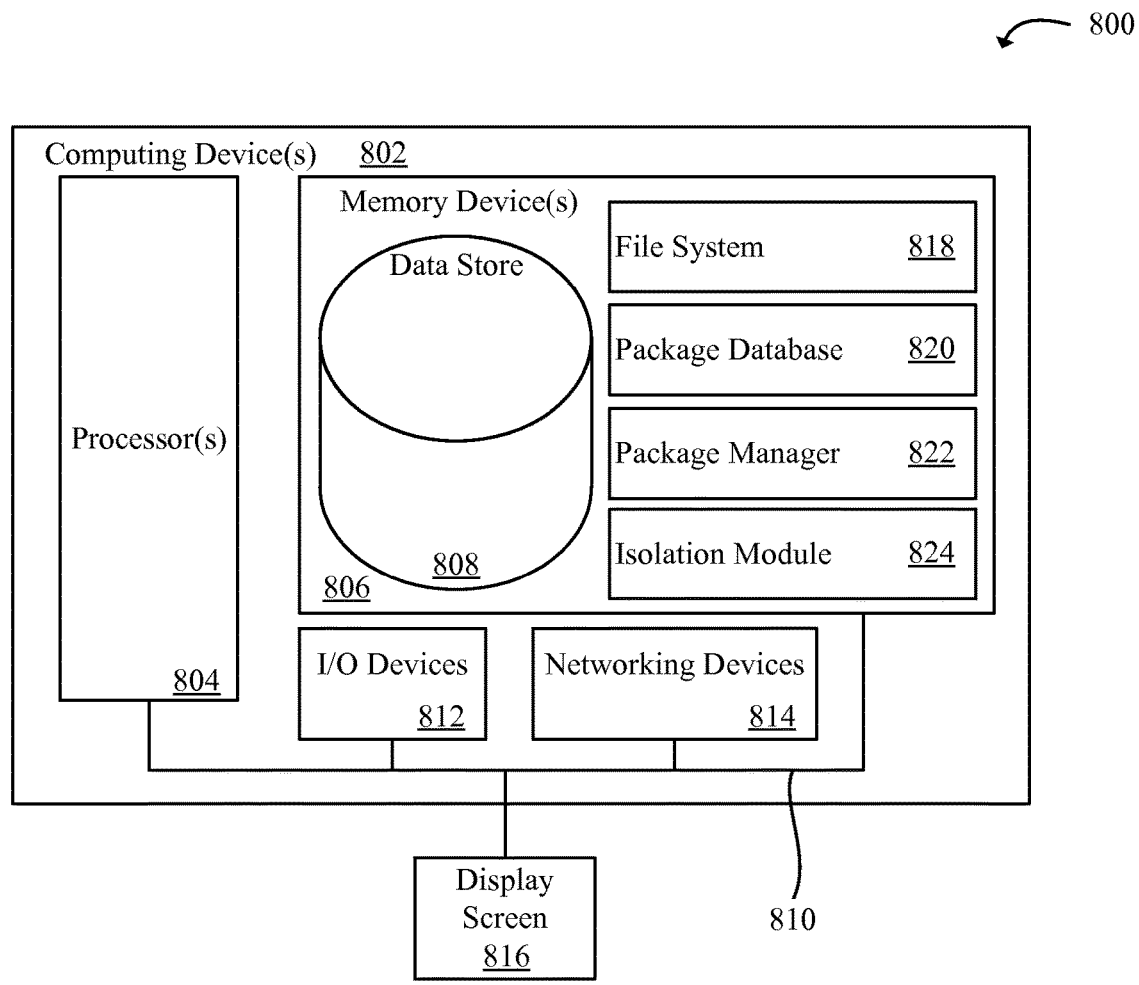
FIG. 8 is block diagram illustrating an example of a computing device 800 that may be used for isolating user software installations.

FIG. 8 is block diagram illustrating an example 800 of a computing device 802 that may be used for isolating user software installations. In particular, the computing device 802 illustrates a high level example of a device on which modules of the disclosed technology may be executed. The computing device 802 may include one or more processors 804 that are in communication with memory devices 806. The computing device 802 may include a local communication interface 810 for the components in the computing device. For example, the local communication interface 810 may be a local data bus and/or any related address or control busses as may be desired.

The memory device 806 may contain modules that are executable by the processor(s) 804 and data for the modules. Located in the memory device 806 are modules executable by the processor. For example, a file system 818, a package database 820, a package manager 822, an isolation module 824 and other modules may be located in the memory device 806. The modules may execute the functions described earlier. For instance, the file system 818 may control how data may be stored and/or retrieved from a data store 808. The file system 818 may also enforce access permissions and ownership permissions for objects (e.g., files and directories) within the file system 818. The file system 818 may have a user directory structure for a user account. The package database 820 may provide a database of software packages. The package manager 822 may manage software packages in the package database and install software packages from the package database into the user directory structure by linking files from the package database into the user directory structure. The isolation module 824 may isolate the file system for the user account by setting a root directory of a file system to be the user directory structure.

The data store 808 may also be located in the memory device 806 for storing data related to the modules and other applications along with an operating system that is executable by the processor(s) 804.

Other applications may also be stored in the memory device 806 and may be executable by the processor(s) 804. Components or modules discussed in this description that may be implemented in the form of software using high programming level languages that are compiled, interpreted or executed using a hybrid of the methods.

The computing device may also have access to I/O (input/output) devices 812 that are usable by the computing devices. An example of an I/O device is a display screen 816 that is available to display output from the computing devices. Other known I/O devices may be used with the computing device as desired. Networking devices 814 and similar communication devices may be included in the computing device. The networking devices 814 may be wired or wireless networking devices that connect to the internet, a LAN, WAN, or other computing network.

The components or modules that are shown as being stored in the memory device 806 may be executed by the processor(s) 804. The term "executable" may mean a program file that is in a form that may be executed by a processor 804. For example, a program in a higher level language may be compiled into machine code in a format that may be loaded into a random access portion of the memory device 806 and executed by the processor 804, or source code may be loaded by another executable program and interpreted to generate instructions in a random access portion of the memory to be executed by a processor. The executable program may be stored in any portion or component of the memory device 806. For example, the memory device 806 may be random access memory (RAM), read only memory (ROM), flash memory, a solid state drive, memory card, a hard drive, optical disk, floppy disk, magnetic tape, or any other memory components.

The processor 804 may represent multiple processors and the memory device 806 may represent multiple memory units that operate in parallel to the processing circuits. This may provide parallel processing channels for the processes and data in the system. The local communication interface 810 may be used as a network to facilitate communication between any of the multiple processors and multiple memories. The local communication interface 810 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium storing a program causing a computer to perform a method to isolate user software installations, the method comprising:
    associating a user directory structure in a file system with a user account;
    installing a software package into a package database directory;
    changing a root directory of a file system hierarchy in the file system for the user account to be the user directory structure;
    mounting the package database directory into a subdirectory of the user directory structure while operating in user execution space; and
    symbolically linking files from the package database directory into the user directory structure to install the software package for the user account while operating in user execution space, wherein the installation of the software package is performed by pointing to the files in the package database directory using symbolic links of the user directory structure, and the user account has access control permission to the user directory structure to execute instructions to symbolically link software packages from the package database into the user directory structure to install a software package into the user directory structure.

2. The non-transitory computer-readable medium of claim 1, wherein a package management account has ownership permissions to the package database directory, and wherein the package management account can install the software package into the package database directory.

3. A computer implemented method, comprising:
    under control of one or more computer systems configured with executable instructions:
        maintaining a package database of software packages;
        isolating a file system for a user account by setting a root directory of a file system hierarchy in the file system to be a user directory structure for the user account thereby creating a user view of the file system for the user account; and
        installing a software package from the package database into the user directory structure by linking files from the package database into the user directory structure, wherein the installation of the software package is performed by pointing to the files in the package database directory using symbolic links of the user directory structure, and the user account has ownership permissions to the user directory structure and can symbolically link software packages from the package database into the user directory structure to install a software package into the user directory structure.

4. The method of claim 3, wherein maintaining the package database comprises:
    generating a package database directory for the package database; and
    generating a set of directories in the package database directory with a unique identifier for each software package in the package database.

5. The method of claim 4, wherein the unique identifier for each software package in the package database is based in part on at least one of: a software package name, a set of package dependencies, a source software package hash value, a software development tool chain used to build the software package, a set of compilation configuration values, a built software package hash value, or an instruction set architecture (ISA) of the software package.

6. The method of claim 4, wherein generating the package database directory includes creating a directory on a storage service, and mounting a network mount pointing to the package database directory on at least one virtualized computing instance which is in communication with the storage service over a network.

7. The method of claim 4, further comprising uninstalling a software package installed in the package database by removing a directory structure associated with the unique identifier for the software package.

8. The method of claim 7, further comprising initiating the uninstallation of the software package from the package database based in part on whether the software package is being used by the user account.

9. The method of claim 3, wherein a package management account has ownership permissions to the package database and can symbolically link software packages from the package database into the user directory structure to install a software package into the user directory structure.

10. The method of claim 9, further comprising:
    requesting installation of a software package from the user account into the package database by a package management account;
    installing the software package into the package database by the package management account; and
    requesting installation of the software package from the user account into the user directory structure by the package management account by linking files from the package database into the user directory structure.

11. The method of claim 3, further comprising uninstalling a software package installed in the user directory structure by unlinking files from the package database into the user directory structure.

12. The method of claim 3, wherein the user directory structure is stored on a storage service, and provided through a network mount point to the user account, the user account being logged onto a virtualized computing instance which in communication with the storage service over a network.

13. A system, comprising:
    a processor;
    a memory device including instructions, that when executed by the processor, cause the system to:
        manage software packages in a package database;
        install software packages from the package database into a user directory structure by linking files from the package database into the user directory structure, wherein the installation of the software package is performed by pointing to the files in the package database directory using symbolic links of the user directory structure, and the user account has access control permission to the user directory structure to execute instructions to symbolically link software packages from the package database into the user directory structure to install a software package into the user directory structure; and
        isolate a file system for a user account by setting a root directory of a file system hierarchy in the file system to be the user directory structure.

14. The system of claim 13, wherein instructions to isolate the file system for the user account include instructions to mount the package database into a subdirectory of the user directory structure.

15. The system of claim 13, wherein instructions to manage software packages in the package database include instructions to generate a unique identifier for each software package in the package database.

16. The system of claim 15, wherein the unique identifier for each software package in the package database is based in part on: a software package name, a set of package dependencies, a source software package hash value, a software development tool chain used to build the software package, a set of compilation configuration values, a built software package hash value, or an instruction set architecture (ISA) of the software package.

17. The system of claim 13, wherein the instructions to isolate the file system for the user account are in a login script that executes when the user account logs into the system.

18. The non-transitory computer-readable medium of claim 1, further comprising executable instructions that:
  generate the package database directory for a package database; and
  generate a set of directories in the package database directory with a unique identifier for each software package in the package database.

19. The non-transitory computer-readable medium of claim 18, wherein the unique identifier for each software package in the package database is based in part on at least one of: a software package name, a set of package dependencies, a source software package hash value, a software development tool chain used to build the software package, a set of compilation configuration values, a built software package hash value, or an instruction set architecture (ISA) of the software package.

20. The non-transitory computer-readable medium of claim 19, wherein generating the package database directory includes creating a directory on a storage service, and mounting a network mount pointing to the package database directory on at least one virtualized computing instance which is in communication with the storage service over a network.

* * * * *